UNITED STATES PATENT OFFICE.

CONRAD SCHRAUBE, OF LUDWIGSHAFEN-ON-THE-RHINE, BAVARIA, ASSIGNOR TO THE BADISCHE ANILIN AND SODA FABRIK, OF MANNHEIM, GERMANY.

ROSINDULINE MONOSULPHO-ACID.

SPECIFICATION forming part of Letters Patent No. 428,530, dated May 20, 1890.

Application filed March 3, 1890. Serial No. 342,444. (No specimens.) Patented in Germany May 6, 1888, No. 45,370, and in England October 23, 1888, No. 15,259.

*To all whom it may concern:*

Be it known that I, CONRAD SCHRAUBE, a subject of the King of Prussia, residing at Ludwigshafen-on-the-Rhine, in the Kingdom of Bavaria and Empire of Germany, have invented new and useful Improvements in the Manufacture of a Monosulpho-Acid of a Basic Naphthaline Derivative, a new raw material for the production of dye-stuffs, (for which I have obtained Letters Patent in Great Britain, No. 15,259, bearing date October 23, 1888, and in Germany, No. 45,370, bearing date May 6, 1888,) of which the following is a specification.

My invention relates to the production of a new sulpho-acid of a red basic naphthaline coloring-matter, which basic coloring-matter has recently received the name of "rosinduline." (Berichte d. Deutsch. Chem. Ges. 21, 2,621, Journ. Chem. Soc. No. 313, Dec., 1888, p. 1291.) This body is formed when derivatives of alpha and beta naphthoquinone and nitroso and azo compounds of the naphthaline group are heated with aniline and aniline hydrochloride.

Although many compounds of these classes may be used for the production of the red basic naphthaline coloring-matter, still in point of economy very variable results are obtained, and I prefer, therefore, to prepare the said basic coloring-matter or rosinduline for the purpose of my invention by melting together about ten (10) parts, by weight, of benzene-azo-naphthylamine in the state of its hydrochloride, ten (10) parts, by weight, of hydrochloride of aniline, and thirty-five (35) parts, by weight, of aniline. The melt is kept at temperature rising gradually from 140° to 170° centigrade for about twelve (12) hours; but in any case the end of the reaction may be ascertained by withdrawing small samples from the melt from time to time and dissolving the said samples in strong sulphuric acid. As soon as no increase in the purity and brightness of the green color of the solutions obtained from successive samples is noticeable, the heating may be interrupted and the melt allowed to cool. The melt is then freed from unused aniline and aniline salt by boiling with dilute hydrochloric acid and filtering on cooling. A further purification of this "crude product" or "melt freed from aniline," which consists of the red basic coloring-matter in a semi-purified condition, may be effected by the aid of suitable solvents and in the most perfect manner by producing the crystallized base. This may be done by first treating one part, by weight, of the above-mentioned crude product or melt freed from aniline and aniline salts with three parts, by weight, of toluene at about 100° centigrade until practically no more impurity is extracted by the toluene. The undissolved residue freed from toluene is then dissolved in about two parts, by weight, of hot alcohol. The reddish purple alcoholic solution thus obtained is filtered and made alkaline with caustic soda, whereupon the base separates out and may, after filtering, washing, drying, and recrystallizing from hot toluene, be obtained as a dark-reddish-brown crystalline powder melting at a temperature of about 233° to 234° centigrade. Now, I have found that the red basic coloring-matter or rosinduline may be converted by sulphonation with concentrated sulphuric acid into a monosulpho-acid, which monosulpho-acid can, owing to the peculiar characteristics of its alkaline salts, be readily obtained in a state of practical purity, and is therefore a valuable and useful material from which to start in the manufacture of dye-stuffs.

The following may serve as an example of the manner in which my invention is or may be best carried into effect. About ten (10) parts, by weight, of the crude material or melt freed from aniline hereinbefore described, (and obtained, preferably, by melting together benzene-azo-alpha-naphthylamine with aniline and hydrochloride of aniline, and subsequently extracting the unused aniline,) are mixed with about thirty (30) parts, by weight, of sulphuric acid containing about ninety-five to ninety-six per cent. of the monohydrate, ($SO_4H_2$,) and, while constantly agitating, the mixture is heated to about one hundred (100) degrees centigrade for about five hours, or until a sample, precipitated and washed with water, forms a practically clear solution upon suspension in pure water, and gradual neutralization with cold and diluted caustic-soda liquor. This point being arrived at, the mixture is introduced into about four hundred (400) parts, by weight, of water, and the precipitate of impure monosulpho-acid thus produced is filtered, washed, and well pressed. The necessary purification is effected by producing the characteristic sodium salt of the monosulpho-acid thus obtained. For this purpose the well-pressed precipitate is intimately mixed with or suspended in about eight hundred (800) parts, by weight, of cold water, and then neutralized by adding gradually the requisite quantity of caustic-soda liquor. If this mixture be then heated to the boiling-point and be made strongly alkaline by adding twenty (20) parts, by weight, of caustic-soda liquor, containing about thirty-five (35) per cent. of sodium hydrate, the sodium salt separates practically completely out from the deeply-colored mother-liquor, which contains but little besides impurities. The mixture is then allowed to cool down to about sixty (60) degrees centigrade and the crystalline precipitate thus obtained is filtered off and, without washing, well pressed. In order to produce the free monosulpho-acid, the pressed product is suspended in water and finally decomposed by diluted sulphuric acid, filtered, washed, and dried.

Now, although the hereinbefore-described separation and purification of the monosulpho acid renders it possible to use the semi-purified melt freed from aniline, as above mentioned, in the preparation of the said monosulpho-acid, still it is possible, though less economical, to use the purified and isolated red basic coloring-matter, either in the free state or as salts. If this said modification of the process be adopted, the monosulpho-acid obtained will, without further purification by means of its sodium salt, as above described, be sufficiently pure for practical purposes.

The monosulpho-acid thus obtained is characterized by the following properties: It is a red crystalline powder practically insoluble in both cold and hot water and but slightly soluble in alcohol. It dissolves in concentrated sulphuric acid, yielding a solution having a bright-green color, which I find is characteristic of rosinduline and its sulpho derivatives. The formation of its sodium salt affords a most characteristic test for the recognition of this acid. If a little of the acid (obtained in a finely-divided state, preferably, by precipitating the sulphuric-acid solution with water) be finely suspended in much pure cold water and just sufficient caustic-soda liquor be added to neutralize, a red solution is obtained, from which, on boiling, the sodium salt of the monosulpho-acid is practically completely precipitated in the state of small shimmering crystals. This crystallization often begins even in the cold, especially on standing. If, instead of boiling, an excess of alkali be added to the above-named red solution, the same substance is precipitated, but in a more amorphous condition. The composition of the free acid is represented by the chemical formula $C_{28}H_{18}N_3SO_3H$.

On account of its insolubility in water this monosulpho-acid cannot be used as a dye-stuff; but in consequence of the above-described formation of its sodium salt it can readily be obtained in a state of practical purity, and is therefore useful as a suitable substance from which to start in the manufacture of the higher sulpho-acids, which are useful dye-stuffs.

What I claim as new, and desire to secure by Letters Patent, is—

1. As a new article of manufacture, the hereinbefore-described monosulpho-acid of rosinduline possessing the chemical composition represented by the formula $C_{28}H_{18}N_3SO_3H$ and characterized by the following properties: it is a red crystalline powder soluble in concentrated sulphuric acid, giving a bright-green solution; it is practically insoluble in both hot and cold water, slightly soluble in alcohol, and yields alkaline salt, also practically insoluble in water, all substantially as hereinbefore described.

2. In a process for the manufacture of the hereinbefore-described monosulpho-acid of rosinduline, the method of purifying the said monosulpho-acid by suspending it in a finely-divided state in much water and adding just sufficient cold dilute caustic alkali to neutralize it, then boiling the resulting mixture and adding a further quantity of caustic alkali, whereby a crystalline precipitate of the alkaline salt is obtained, which after being collected and dried can be converted by the action of a mineral acid into practically pure monosulpho-acid, substantially as described.

In testimony whereof I have hereunto set my hand in the presence of two subscribing witnesses.

CONRAD SCHRAUBE.

Witnesses:
GEORG KOERNER,
HERMANN HAUG.